United States Patent [19]

Ogawa et al.

[11] 4,291,339
[45] Sep. 22, 1981

[54] FACSIMILE TRANSCEIVER

[75] Inventors: Mutsuo Ogawa; Noboru Murayama; Akira Konishi; Norisada Takeuchi, all of Tokyo, Japan

[73] Assignee: Ricoh Company, Ltd., Tokyo, Japan

[21] Appl. No.: 906,013

[22] Filed: May 15, 1978

[30] Foreign Application Priority Data

May 16, 1977 [JP] Japan ............................ 52-56775
May 16, 1977 [JP] Japan ............................ 52-56777

[51] Int. Cl.³ ........................................ H04N 7/12
[52] U.S. Cl. ................................ 358/260; 358/261
[58] Field of Search ............ 358/133, 135, 138, 260, 358/261, 280

[56] References Cited

U.S. PATENT DOCUMENTS

| | | | |
|---|---|---|---|
| 2,921,124 | 1/1960 | Graham | 358/135 |
| 3,781,902 | 12/1973 | Shim et al. | 358/289 |
| 3,801,737 | 4/1974 | Komura et al. | 358/135 |
| 3,887,763 | 6/1975 | Hinoshita et al. | 358/133 |
| 3,940,737 | 2/1976 | Beun | 340/146.3 MA |
| 3,974,326 | 8/1976 | Rosdolsky et al. | 358/280 |
| 4,068,266 | 1/1978 | Liao | 358/280 |
| 4,163,260 | 7/1979 | Hisao et al. | 358/261 |

FOREIGN PATENT DOCUMENTS 2219259 11/1973 Fed. Rep. of Germany ...... 358/138
2416728 10/1975 Fed. Rep. of Germany ...... 358/260
2320017 2/1977 France ............................ 358/133

OTHER PUBLICATIONS

Wong-Picture Restoration Algorithm for Facsimile Machines, IBM Tech. Discl. Bull., vol. 19, #2 pp. 668-671, Jul. 1976.

Primary Examiner—Joseph A. Orsino, Jr.
Attorney, Agent, or Firm—David G. Alexander

[57] ABSTRACT

A scanner scans an original document in two orthogonal directions and produces binary data signals representing the document. An extractor combines each two scan lines into one scan line by taking the logical sum of the data signals in corresponding positions in the two original scan lines. Each second data signal is removed. The data signals in even positions in one line are removed and the data signals in odd positions in the succeeding line are removed, thereby removing the data signals in a zig-zag manner. The data signals so processed are subjected to run-length encoding. In a receiver, the data signals are run-length decoded and fed into an interpolator which senses the data signals and inserts data signals into the spaces from which data signals were removed in accordance with a predetermined logical function. The interpolator controls a printer to print each scan line twice to reproduce the original document.

9 Claims, 46 Drawing Figures

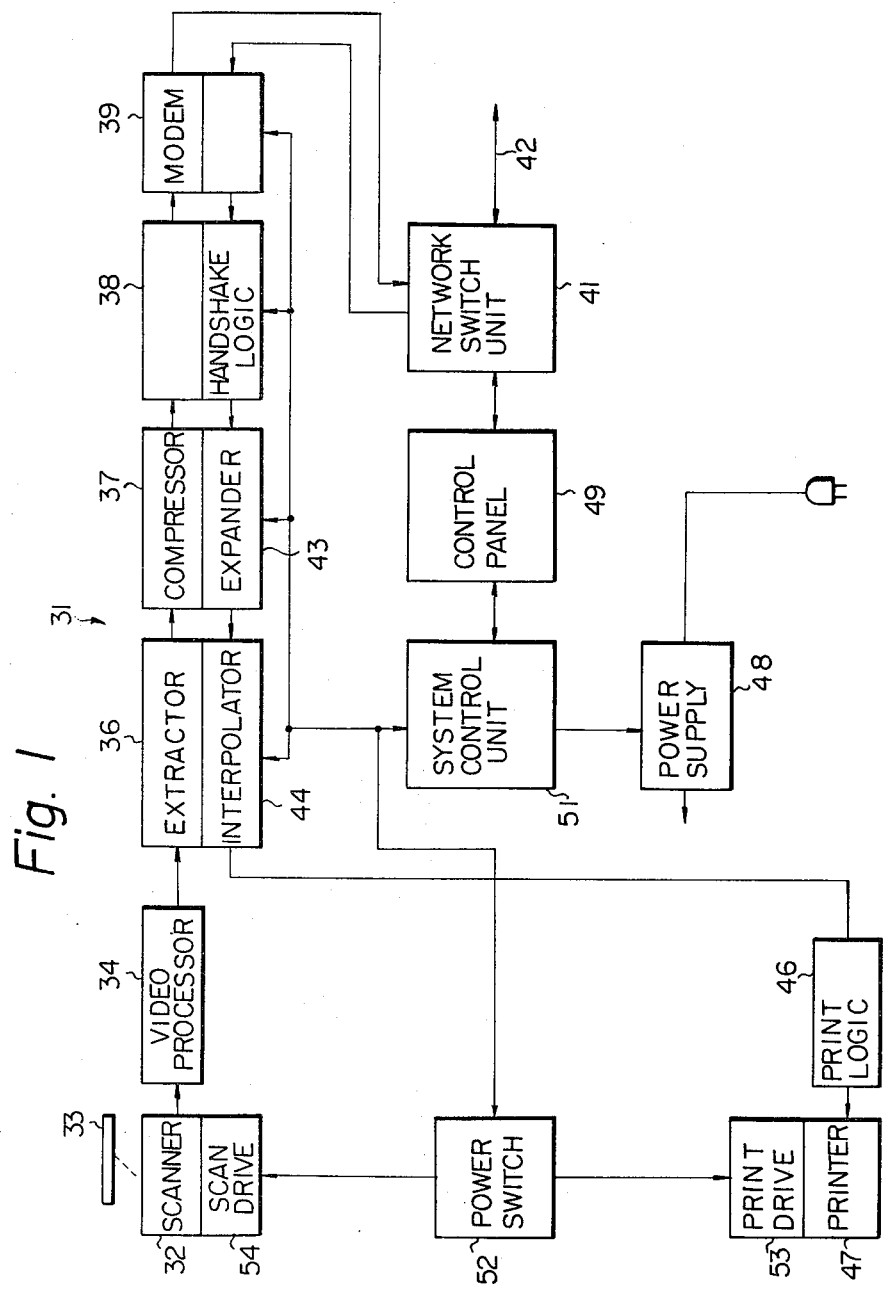

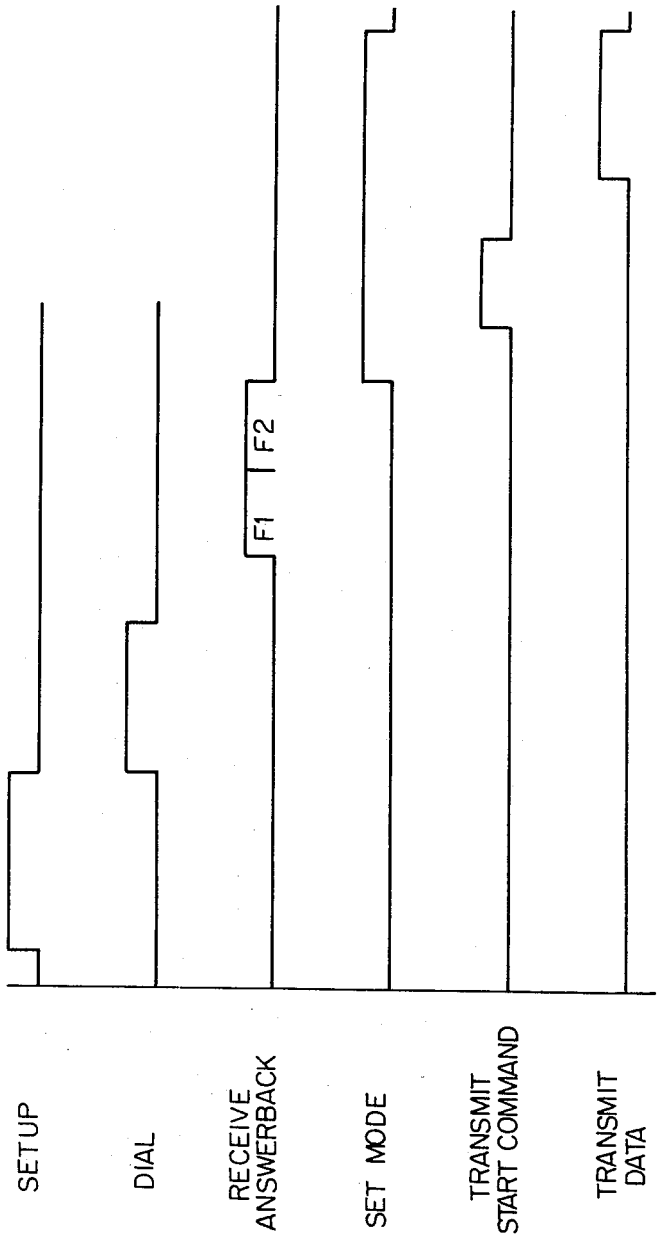

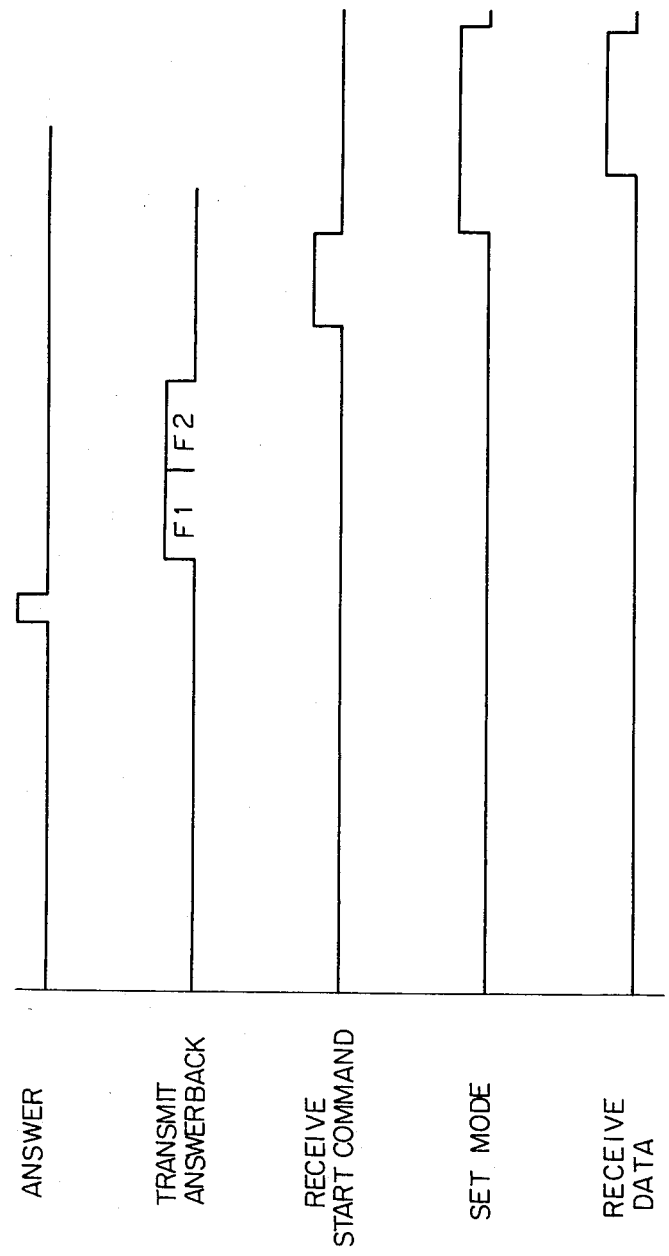

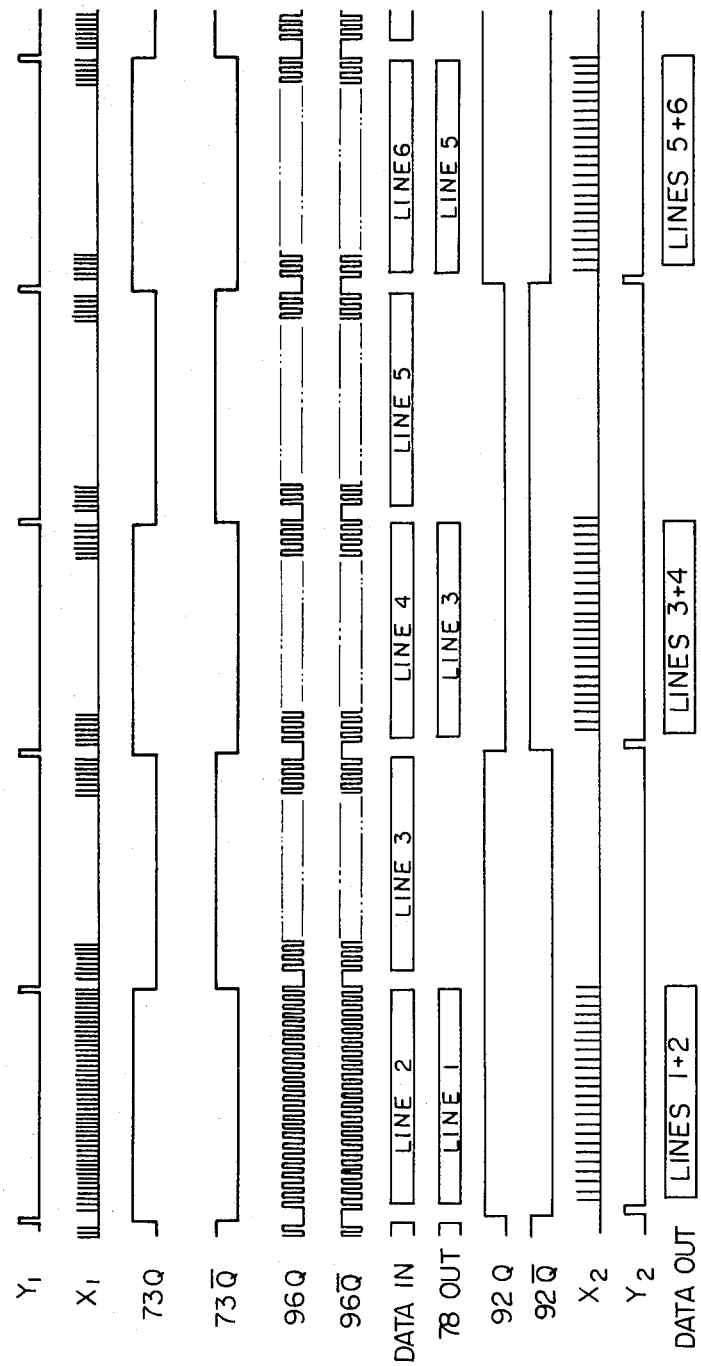

OOOOOOOO●OO
OOOOOOOOOOO
OOOOOOOO●OO
OOOOOOOOOOO
OOOOOOOOO●O
OOOOOOOOOOO

OO●●●●●●OO
OOOOOOOOOOO
OO●●●●●●OO
OOOOOOOOOOO
●●●●●●●●●O
OOOOOOOOOOO

O O O O ● O
 O O O O O
O O O O ● O
 O O O O O
O O O O O O
 O O O O O

O ● ● ● ● O
 O O O O O
O ● ● ● ● O
 O O O O O
● ● ● ● ● ●
 O O O O O

*Fig. 13a*  *Fig. 13b*
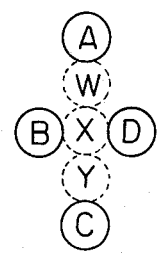
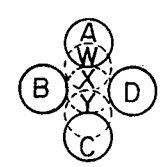
*Fig. 14a*  *Fig. 14b*
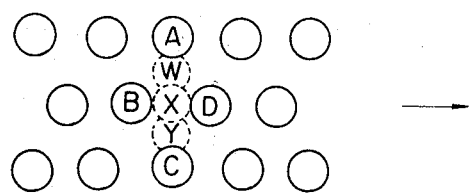
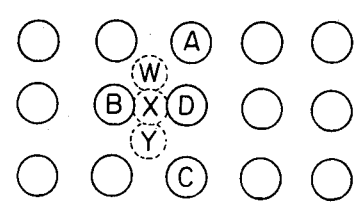
*Fig. 14c*  *Fig. 14d*
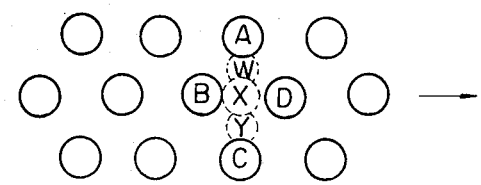
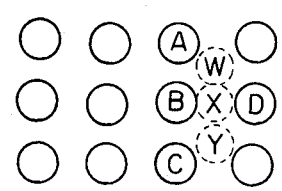

Fig. 20a    Fig. 20b
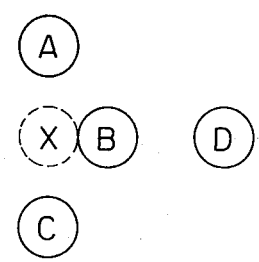
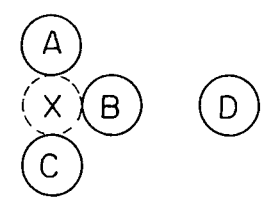
Fig. 21
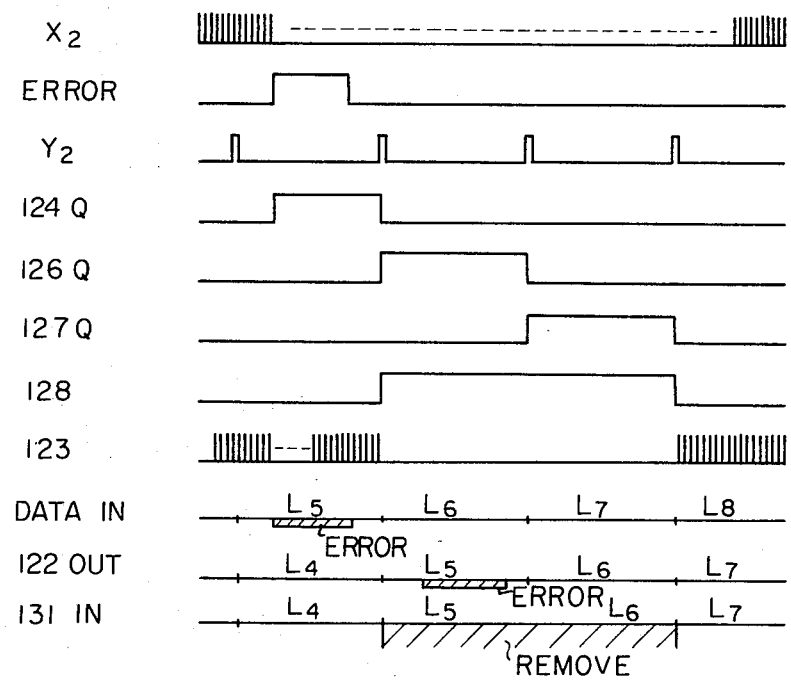

FACSIMILE TRANSCEIVER

BACKGROUND OF THE INVENTION

The present invention relates to a high-compression facsimile apparatus. In a facsimile apparatus of the present type a scanner scans an original document and produces binary data signals representing the document. In order to increase the transmission speed, the data signals are preferably compressed by run-length encoding or some other system and transmitted to a remote receiver. The receiver expands the compressed data signals and prints a reproduction or facsimile of the original document in accordance therewith.

Many data compression methods have been devised in the prior art, but none provide a very high degree of compression in combination with high image resolution and low distortion.

SUMMARY OF THE INVENTION

In a facsimile apparatus having a transmitter and a receiver, the transmitter comprises a scanner for scanning an original document and producing first binary signals representing the document. An extractor extracts relevant data from the first data signals and produces second data signals corresponding thereto in a number less than the first data signals. A compressor compresses the second data signals in accordance with any known compression method. The receiver comprises an expander for expanding the compressed second data signals. An interpolator senses the second data signals and inserts data signals thereinto which correspond to the sensed second data signals in a predetermined manner so that a sum of the second data signals and inserted data signals is equal to the number of first data signals. A printer reproduces the original document in response to the second data signals and inserted data signals.

It is an object of the present invention to provide a facsimile apparatus which achieves a higher data compression rate than possible in the prior art.

It is another object of the present invention to provide a facsimile apparatus which can operate at several selected speeds.

It is another object of the present invention to provide a facsimile apparatus which produces high quality facsimile reproductions at higher speed than is possible in the prior art.

It is another object of the present invention to provide a generally improved high compression facsimile apparatus.

Other objects, together with the foregoing, are attained in the embodiments described in the following description and illustrated in the accompanying drawing.

BRIEF DESCRIPTION OF THE DRAWING

FIG. 1 is a system block diagram of a facsimile transceiver embodying the present invention;

FIGS. 2a and 2b are timing diagrams of the present apparatus in transmission and reception respectively;

FIG. 8 is a timing diagram of the extractor;

FIGS. 13a and 13b are diagrams illustrating the operation of the interpolator;

FIGS. 14a and 14d are diagrams further illustrating the operation of the interpolator;

FIGS. 20a and 20b are diagrams illustrating erroneous interpolation caused by a data error; and FIG. 21 is a timing diagram illustrating data error removal by the present apparatus.

DESCRIPTION OF THE PREFERRED EMBODIMENTS

Figure 3:
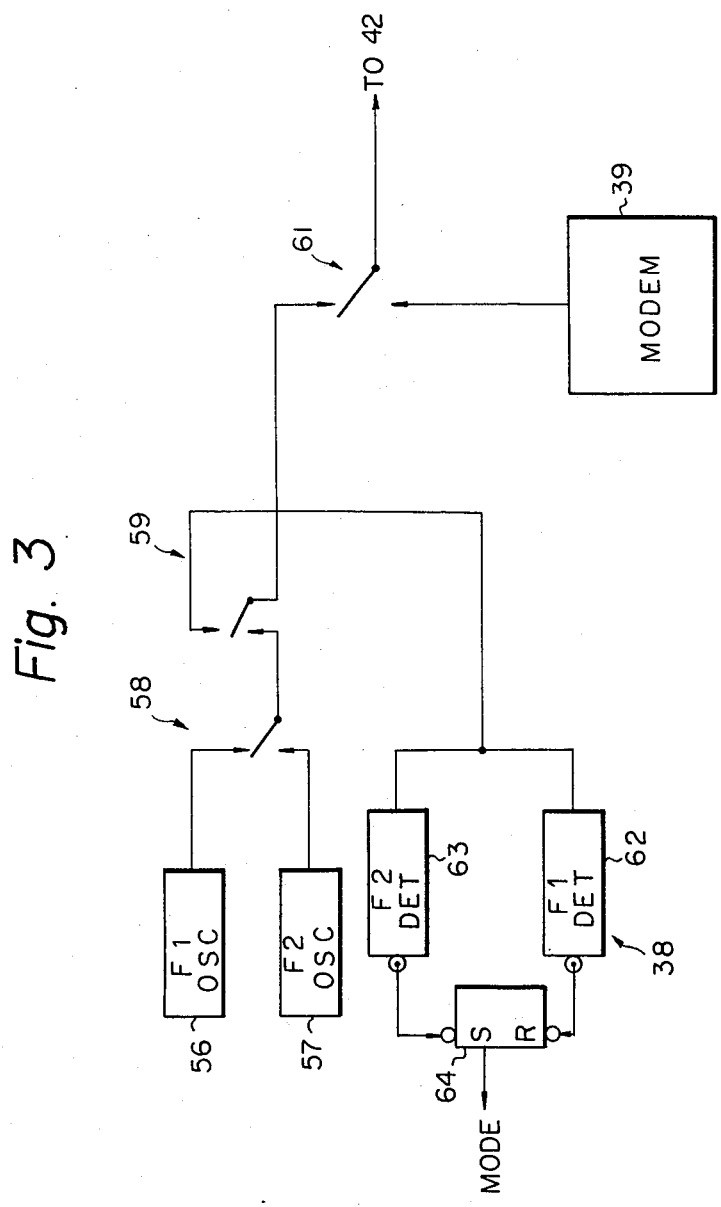
FIG. 3 is a block diagram illustrating a transmission speed selection portion of the present apparatus.

While the facsimile apparatus of the invention is susceptible of numerous physical embodiments, depending upon the environment and requirements of use, substantial numbers of the herein shown and described embodiments have been made, tested and used, and all have performed in an eminently satisfactory manner.

Referring now to FIG. 1 of the drawing, a high compression facsimile apparatus or transceiver embodying the present invention is generally designated by the reference numeral 31 and comprises a scanner 32 which electronically scans an original document 33 in two orthogonal directions. Typically, the scanner 32 comprises a linear photosensor array such as produced by CCD (charge coupled device) technology which is commercially available. The document 33 is scanned in the horizontal direction by sequentially enabling the individual photosensor elements (not shown) of the array. The document 33 is moved perpendicular to the array by one increment after each horizontal scan, thus efffecting vertical scan. The particular arrangement of the components of the scanner 32 is not the subject matter of the present invention and is not shown.

The scanner 32 produces a large number of data signals, such as 1728, for each scan line. The data signals are logically high, representing dark areas of the document 33 or logically low, representing light or background areas of the document 33. Where the scanner 32 produces analog data signals having magnitudes proportional to incident light, a video processor 34 is provided to quantize the data signals into binary form.

In accordance with the present invention, an extractor 36 samples the data signals and extracts relevant information therefrom. The extractor 36 produces data signals in compressed form which correspond to the input data signals. This operation will be described in detail below.

The data signals from the extractor 36 are fed through a compressor 37 which compresses the data signals in accordance with run-length encoding or any other known compression method. The compressed data signals are fed through a handshake logic unit 38, a modem 39 and a network switch unit 41 to a remote transceiver (not shown) over a communication line 42.

The scanner 32, video processor 34, extractor 36 and compressor 37 constitute a transmitter of the apparatus 31. A receiver of the apparatus 31 comprises a data expander 43 which expands compressed data signals transmitted to the apparatus 31 from a remote transceiver. An interpolator 44 senses the output data signals from the expander 43 and inserts data signals into the data signal stream which correspond to the sensed data signals in accordance with a predetermined Boolean algebra logical equation. The data signals are fed from the interpolator 44 to a print logic unit 46 which controls the operation of a printer 47. The printer 47 reproduces the original document 33 in accordance with the data signals applied thereto from the print logic unit 46.

Further illustrated in FIG. 1 are a power supply 48, control panel 49 provided with switches and indicators (not shown) for control of the apparatus 31, a system control unit 51 which controls the overall operation of the apparatus 31 as commanded by the switches on the control panel 49, a print drive unit 53 for the printer 47 and a power switch unit 52 which switches power to the print drive unit 53 or a scan drive unit 54 for the scanner 32 as required.

The basic operation of the apparatus 31 in transmission and reception is illustrated in FIGS. 2a and 2b respectively. First, an original document is set into the transmitting apparatus and the proper control switches set. Then, the transmitting apparatus calls the receiving apparatus. Where the communication line 42 is a public telephone system, the transmitting apparatus dials the number of the receiving apparatus.

The receiving apparatus answers the call and transmits an answerback signal indicating the transmission modes in which it is possible to operate. The transmitting apparatus receives the answerback signal and selects the transmission mode of the receiver with the highest priority. The transmitting apparatus then transmits a mode set signal to the receiving apparatus. This sets the transmitting and receiving apparatus to the same transmission mode. These functions are performed by the handshake logic unit 38. After the mode is set, the transmitting apparatus transmits a transmit start command which causes the receiving apparatus to prepare for reception. Then, the transmitting apparatus transmits the data signals representing the original document to the receiving apparatus.

The apparatus 31 is capable of operating in a straight transmission mode in which the extractor 36 is inhibited or disabled and the extraction mode described above. As shown in FIG. 3, the handshake logic unit 38 comprises oscillators 56 and 57 which may be energized to produce frequencies F1 and F2 respectively. The oscillators 56 and 57 are connected to the modem 39 and communication line 42 through single-pole, double-throw switches 58, 59 and 61. The switch 59 is also connected to frequency detectors 62 and 63 which detect the frequencies F1 and F2 respectively. The outputs of the frequency detectors 62 and 63 are connected to set and reset inputs respectively of a flip-flop 64. The output of the flip-flop 64 constitutes a signal MODE which is logically high for the extraction mode and logically low for the straight transmission mode.

For transmission, the switch 58 is set to connect the selected oscillator 56 and 57 to the switch 59. The switch 59 is set to connect the switch 58 to the switch 61. The switch 61 is set to connect the switch 59 to the communication line 42.

Then the selected oscillator 56 or 57 is energized to transmit the frequency F1 or F2 to the receiving apparatus over the communication line 42. In the receiving apparatus, the switch 61 is set to connect the modem 39 to the switch 59. The switch 59 is set to connect the switch 61 to the frequency detectors 62 and 63. The position of the switch 58 is irrelevant.

The modem 39 receives either the frequency F1 or F2 from the transmitting apparatus which is detected by the frequency detector 62 or 63. Where the frequency F1 is detected indicating the straight transmission mode, the frequency detector 62 produces a high output which resets the flip-flop 64. In this case, the flip-flop 64 produces a low MODE output indicating straight transmission. On the other hand, if the frequency F2 is received, the frequency detector 63 produces a high output which sets the flip-flop 64. The high output MODE of the flip-flop 64 indicates the extraction mode.

Figure 4A:
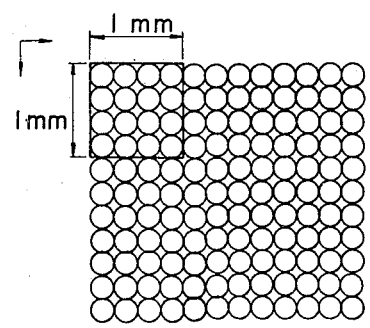
FIGS. 4a to 4f are diagrams illustrating scanning and reproduction operations of the present apparatus.
Figure 4D:
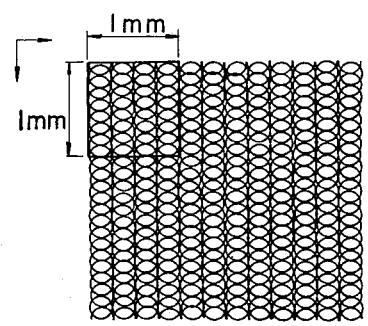
Figure 4B:
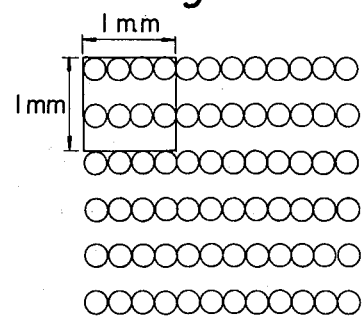
Figure 4E:
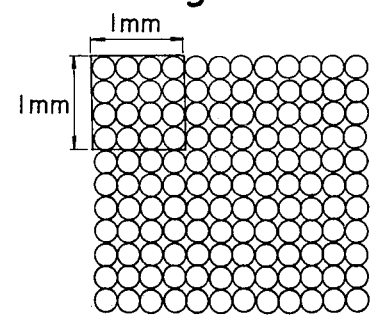
Figure 4C:
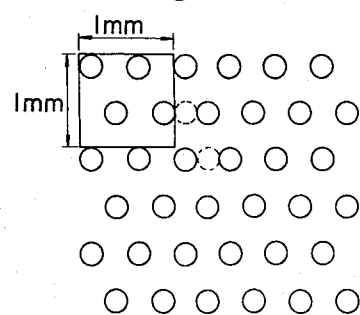
Figure 4F:
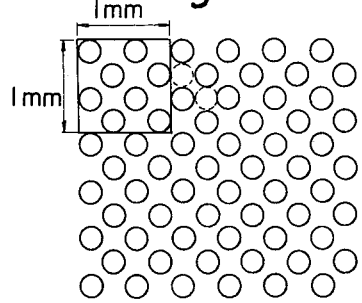

FIGS. 4a to 4c illustrate the operation of the extractor 36 in a normal scan mode whereas FIGS. 4d to 4f illustrate the operation of the extractor 36 in a dense scan mode.

FIG. 4a illustrates the data signals from the video processor 34 in relation to their position on the original document 33. It will be seen that there are four data points per millimeter along each horizontal scan line and furthermore that there are four scan lines per millimeter in the vertical direction. FIG. 4b shows how each two adjacent scan lines are combined into one scan line by taking the logical sum of data signals in corresponding positions in the two adjacent scan lines. FIG. 4c shows how every second data signal is removed in each scan line in a zig-zag manner. In other words, the data signals in even positions are removed in one scan line whereas the data signals in odd positions are removed in the two scan lines adjacent to said one scan line. Thus, the even and odd data signals are removed in alternating scan lines as illustrated.

In FIGS. 4a to 4c the vertical scan distance is equal to one data point. However, in the dense scan mode shown in FIGS. 4d to 4f, the vertical scan distance is one-half of one data point. It will be seen that the data points overlap in the dense scan mode. The only difference between the normal and dense scan modes is the vertical scan distance; the horizontal scan is the same.

Figure 5:
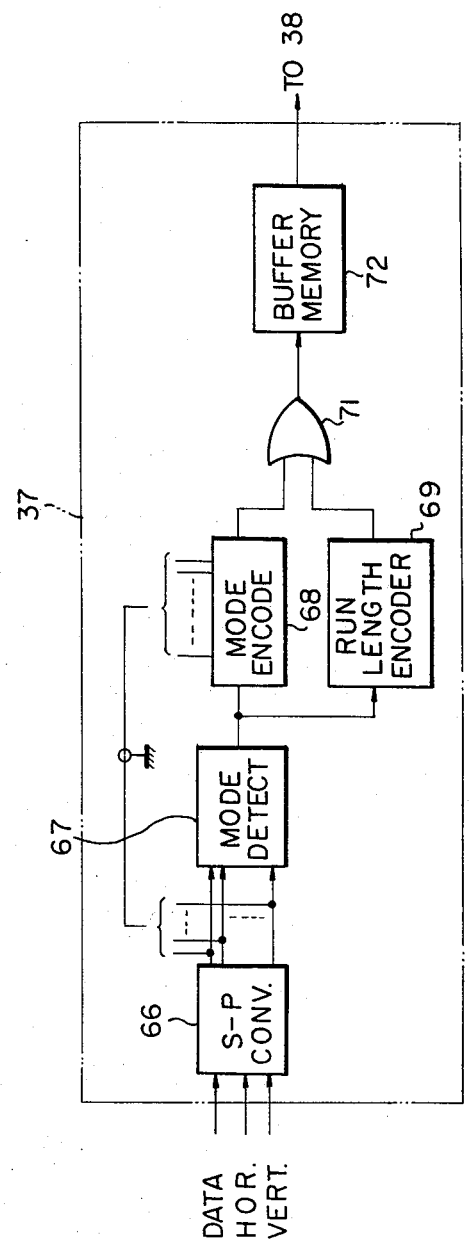
FIG. 5 is a block diagram of a run-length encoding portion of the present apparatus.
Figure 6A:
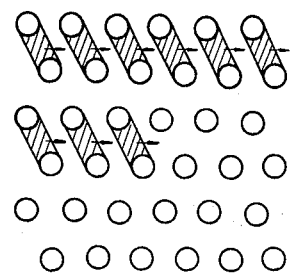
FIGS. 6a to 6d are diagrams illustrating the operation of the encoding portion of the present apparatus.
Figure 6C:
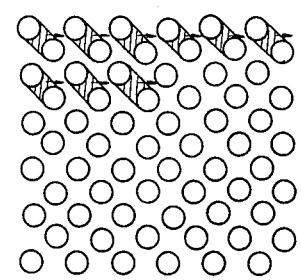
Figure 6B:
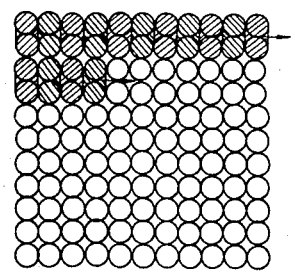
Figure 6D:
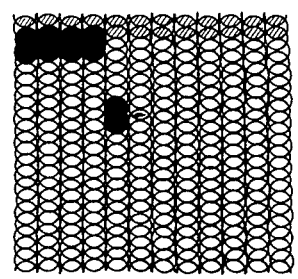

FIG. 5 illustrates the compressor 37 as comprising a serial-parallel converter 66 which receives the data signals from the extractor 36 along with horizontal and vertical synchronization pulses. The converter 66 processes two scan lines at once so that the data signals constitute pairs as illustrated in FIGS. 6a and 6b for the normal mode and 6c and 6d for the dense mode. A mode detector 67 detects transitions from high to low runs of data signals and feeds a transition signal to a mode encoder 68. The encoder 68 receives the output signals from the converter 66 and produces a code indicating whether the transition is from high to low or vice-versa. A run-length encoder 69 produces a code indicating the run length. These two codes which constitute run-length encoded data signals are passed through an OR gate 71 into a buffer memory 72. This is because the compression speed generally varies from the transmission speed depending on the type of data. The signals from the buffer memory 72 are fed to the logic unit 38 for transmission at a predetermined speed. The compressor 37 generally functions to count the number of successive high data signals and produce the run length code as indicating the count. The compressor 37 then counts the number of successive low data signals and produces another run-length code indicating the count along with a mode change signal (indicating the transition from high to low run length).

The operation of the compressor 37 which processes two scan lines at once provides a means of removing erroneous data signals from the transmitted data. Due to the zig-zag extraction process, if one scan line comprises erroneous or missing data signals, the entire interpolation process will be erroneous, resulting in an unintelligible reproduction. To overcome this problem, means may be provided to the buffer memory 72 to sense the compressed data for errors. If no erroneous data is sensed, the two scan lines in the buffer memory 72 are transmitted as one block. If erroneous data is sensed, transmission of the two scan lines is inhibited (the two scan lines are removed). Although this results in slight distortion in reproduction, the interpolation logic is not effected since the interpolator 44 does not operate on erroneous (displaced) data. Thus, only error-free blocks of data are transmitted.

Figure 7:
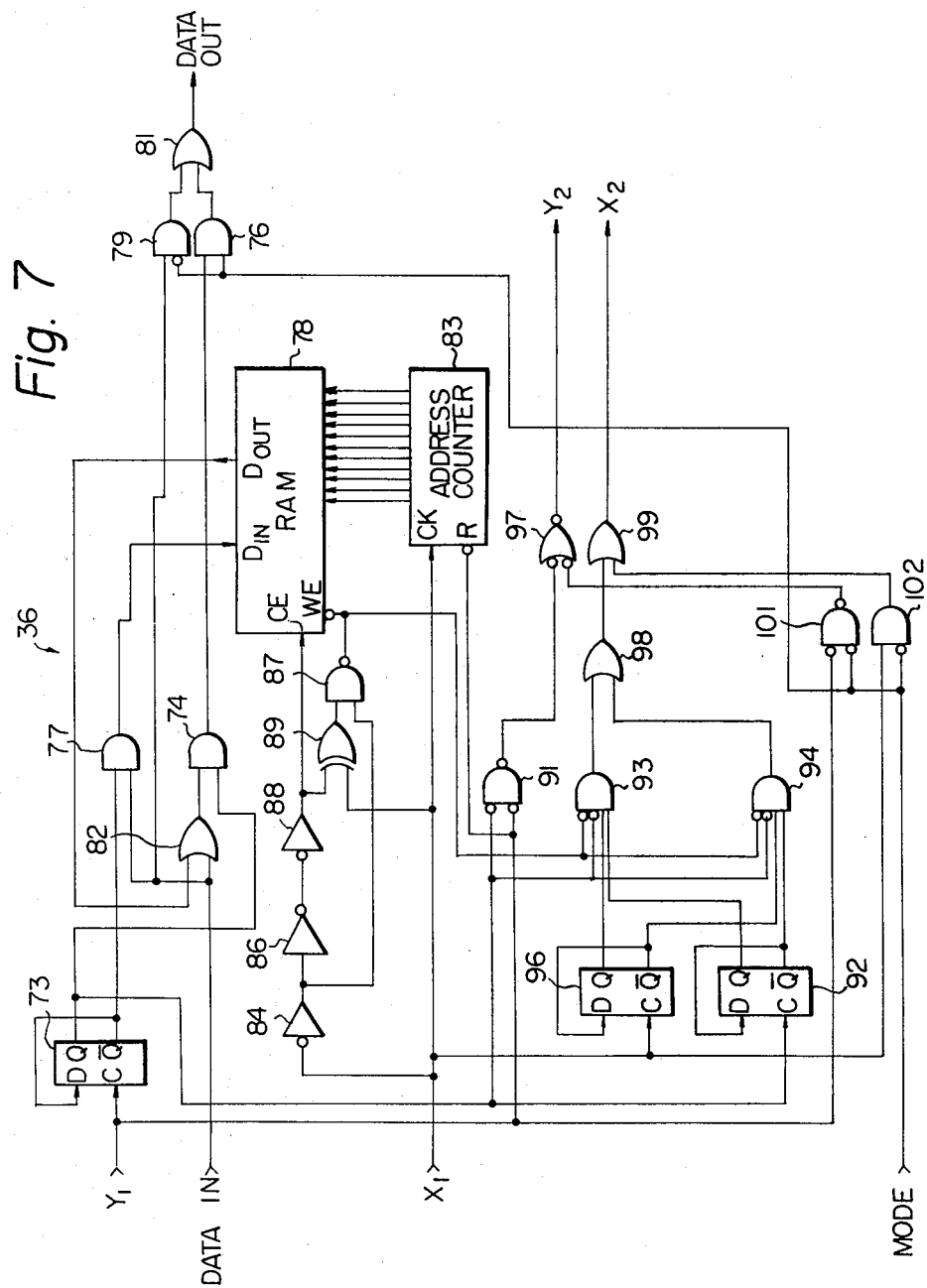
FIG. 7 is a schematic diagram of an extractor of the present apparatus.

The extractor 36 is shown in FIG. 7 as comprising a D-type flip-flop 73, the clock input of which is connected to receive vertical synchronization pulses Y1. One pulse Y1 is produced at the end of each scan line. The $\overline{Q}$ output of the flip-flop 73 is connected to the D input thereof to make the flip-flop 73 operate as a toggle flip-flop. The Q output of the flip-flop 73 is connected to an input of an AND gate 74, the output of which is connected to an input of an AND gate 76. The $\overline{Q}$ output of the flip-flop 73 is connected to an input of an AND gate 77, the output of which is connected to a data input of a random access memory (RAM) 78 having a capacity of 1728 bits. The data signals from the video processor 34 are applied directly to an input of the AND gate 77 and to an input of an AND gate 79. The outputs of the AND gates 76 and 79 are connected through an OR gate 81 to the compressor 37. The data signals are also applied to the input of an OR gate 82, the output of which is connected to an input of the AND gate 74. A data output of the RAM 78 is connected to another input of the OR gate 82.

Horizontal synchronization pulses X1 are applied to a clock (count) input of an address counter 83 which is connected to the RAM 78. One pulse X1 is produced for each data signal. The memory location addressed in the RAM 78 corresponds to the count in the address counter 83.

The pulses X1 are also applied to an input of an inverter 84, the output of which is connected to an input of an inverter 86 and also to an input of a NAND gate 87. The output of the inverter 86 is connected to the input of an inverter 88, the output of which is connected to a chip enable input of the RAM 78. The output of the inverter 88 and the pulses X1 are applied to inputs of an exclusive OR gate 89, the output of which is connected to a write enable input of the RAM 78. The inverters 84, 86 and 88 in combination with the exclusive OR gate 89 and NAND gate 87 control the reading and writing operation of the RAM 78.

The Q output of the flip-flop 73 is connected to an inverting input of a NAND gate 91 and also to a clock input of a D-type flip-flop 92. The $\overline{Q}$ output of the flip-flop 92 is connected to the D input thereof to make the flip-flop 92 toggle. The Q output of the flip-flop 92 is connected to an input of an AND gate 93 whereas the $\overline{Q}$ output of the flip-flop 92 is connected to an input of an AND gate 94.

The pulses X1 are applied to a clock input of a D-type flip-flop 96. The $\overline{Q}$ output of the flip-flop 96 is connected to the D input thereof. The Q output of the flip-flop 96 is connected to an input of the AND gate 93. The $\overline{Q}$ output of the flip-flop 96 is connected to an input of the AND gate 94. The Q output of the flip-flop 73 is connected to inverting inputs of the AND gates 93 and 94. The pulses Y1 are applied to an inverting input of the NAND gate 91. The output of the NAND gate 91 is connected to an inverting input of a NOR gate 97 which produces at its output pulses Y2. The outputs of the AND gates 93 and 94 are connected to inputs of an OR gate 98, the output of which is connected to an input of an OR gate 99. The OR gate 99 produces at its output pulses X2.

The pulses Y1 are applied to an inverting input of a NAND gate 101, the output of which is connected to an inverting input of the NOR gate 97. The pulses X1 are applied to an input of an AND gate 102, the output of which is connected to an input of the OR gate 99. The MODE signal is applied to an input of the AND gate 76, an inverting input of the AND gate 79, an inverting input of the NAND gate 101 and an inverting input of the AND gate 102. The pulses Y1 are applied to a reset input of the counter 83. The output of the NAND gate 87 is connected to inverting inputs of the AND gates 93 and 94.

In the straight transmission mode where the signal MODE is logically low, the AND gate 79 is enabled while the AND gate 76 is inhibited. The NAND gate 101 and AND gate 102 are enabled. The data signals are gated through the AND gate 79 and OR gate 81 to the compressor 37 without alteration. The Y1 pulses are gated through the NAND gate 101 and NOR gate 97 to constitute the pulses Y2. Although the pulses Y2 are inverted four times by the gates 101 and 97, they are identical to the pulses Y1. The X1 pulses are gated through the AND gate 102 and OR gate 99 without alternation to constitute the X2 pulses.

In the extraction mode, the signal MODE is high. Thus, the AND gate 76 is enabled whereas the AND gate 79, NAND gate 101 and AND gate 102 are inhibited. The flip-flop 73 controls the operation of combining two scan lines into one. The flip-flop 96 controls the removal of every other data signal in a scan line. The flip-flop 92 controls the zig-zag data signal removal operation.

The flip-flop 73 is toggled by every pulse Y1. In other words, where one pulse Y1 causes the flip-flop 73 to be set the next pulse Y1 causes the flip-flop 73 to be reset. The flip-flops 92 and 96 toggle in the same manner in response to pulses at the clock pulses thereof.

When the Q output of the flip-flop 73 is high, the AND gate 74 is enabled. The low $\overline{Q}$ output of the flip-flop 73 inhibits the AND gate 77. Thus, data signals are gated through the OR gate 82, AND gate 74, AND gate 76 and OR gate 81 to the compressor 37. However, the output of the RAM 78 is applied to the other input of the OR gate 82, and the RAM 78 is in the read mode. As will become clear from further description, the previous scan line is stored in the RAM 78. The address counter 83 is incremented by the pulses X1 to address sequentially higher memory locations in the RAM 78. In this manner, the data signal of the previous scan line which is in the same position (same column) as the data signal of the current scan line which is being applied to one input of the OR gate 82 is applied to the other input of the OR gate 82. For example, if the 5th data signal of current scan line is being applied to the OR gate 82, the 5th data signal of the previous scan line is also applied to the OR gate 82 at the same time. Thus, the OR gate 82 produces the logical sum (OR function) of the data signals in corresponding positions in the current and previous scan line. In this manner, the OR gate 82 produces 1728 data signals for each two scan lines.

When the flip-flop 73 is reset by the next pulse Y1, the RAM 78 is also reset. The low Q output of the flip-flop 73 inhibits the AND gate 74. However, the high $\bar{Q}$ output of the flip-flop 73 enables the AND gate 77. Thus, the data signals for the next scan line are stored in the RAM 78 in response to the next 1728 pulses X1. In other words, one scan line is stored in the RAM 78 during which time the extractor 36 produces no data signal output. This scan line is subsequently OR'd with the next scan line and the logical sum signals of the two scan lines fed out of the extractor 36. Data signals are output when the Q output of the flip-flop 73 is high. Data signals are written into the RAM 78 when the Q output of the flip-flop 73 is low.

The flip-flop 96 is toggled by the X1 pulses in such a manner that the Q output thereof goes high in response to every second X1 pulse. The high Q output of the flip-flop 96 is applied to the AND gate 93. However, the AND gate 93 is only enabled when the Q outputs of the flip-flops 73 and 92 are also high, which occurs when data signals are being OR'd and output. Thus, every second pulse X1 is gated through the AND gate 93, OR gate 98 and OR gate 99 as the S2 pulses when the Q outputs of the flip-flops 73 and 96 are high. The frequency of the X2 pulses is therefore one-half the frequency of the X1 pulses. Where the X2 pulses are used as horizontal synchronization or sampling pulses, it will be seen that although 1728 data signals are output from the OR gate 81 only 864 sampling pulses X2 are produced and every second data pulse is eliminated since a corresponding sampling pulse X2 is not produced.

Whereas for the current scan line the Q output of the flip-flop 92 is assumed to be high, the next high output of the flip-flop 73 will toggle the flip-flop 92 so that the Q output thereof will go low. This will inhibit the AND gate 93. It will be noted that the Q output of the flip-flop 73 goes high for every second scan line or pulse Y1 and Q output of the flip-flop 92 goes high for each fourth scan line or pulse Y1. Thus, the Q output of the flip-flop 92 goes high for every second OR'd scan line (every fourth original scan line).

The high $\bar{Q}$ output of the flip-flop 92 enables the AND gate 94 which is connected to the $\bar{Q}$ output of the flip-flop 96. The Q output of the flip-flop 96 goes high for every second pulse X1. However, the $\bar{Q}$ output of the flip-flop 96 is 180° out of phase with the Q output thereof. As best seen in FIG. 8, the pulses applied to the AND gate 94 are therefore 180° out of phase with the pulses applied to the AND gate 93. Thus, with the Q output of the flip-flop 92 low, the X2 pulses will be constituted by every second X1 pulse, but the pulses X1 which are eliminated are 180° out of phase with the pulses X1 which are eliminated when the Q output of the flip-flop 92 is high. In this manner, even data signals are eliminated in one scan line whereas odd data signals are eliminated in the next scan line, and so on.

The NAND gate 91 serves to eliminate every other Y1 pulse so that the Y2 pulses have one-half the frequency of the Y1 pulses. The NAND gate 91 is enabled only when Q output of the flip-flop 73 is low. Thus, every second Y1 pulse is gated through the NAND gate 91 and NOR gate 97 as a Y2 pulse, being inverted four times in the process.

Figures 9A, 9B, 9C, 9D, 9E:
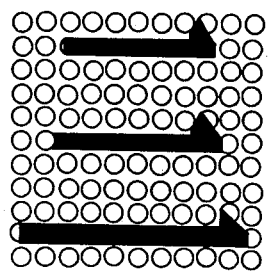
FIGS. 9a to 9e are diagrams illustrating facsimile reproduction of an original document having thin lines.

FIGS. 9a to 9e show how the logical sum operation of the extractor 36 prevents the loss of thin lines. Where a document such as shown in FIG. 9a is scanned and every other scan line simply removed (without the logical summation) the result will be as shown in FIG. 9b. After removal of every second data signal in the scan lines, the result will be as shown in FIG. 9c. It will be seen that the lines are almost completely lost.

However, logical summation of two adjacent scan lines in accordance with the present invention produces results shown in FIG. 9d. Removal of every second data signal in the scan lines produces the pattern shown in FIG. 9e. It will be seen that the thin lines are not lost in accordance with the present invention.

Figure 10A:
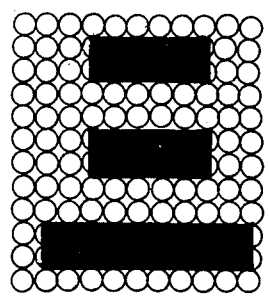
FIGS. 10a to 10e are diagrams illustrating facsimile reproduction of an original document having thick lines.
Figure 10B:
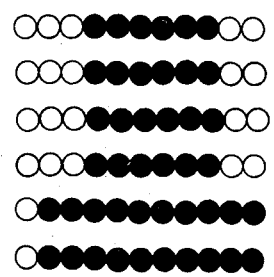

However, a problem may be encountered where several thick lines or dark areas are spaced close together, as shown in FIG. 10a. The logical summation will produce the pattern of FIG. 10b, in which the dark areas are merged into a single large dark area. Removal of every second data signal will produce the pattern of FIG. 10c.

Figure 11:
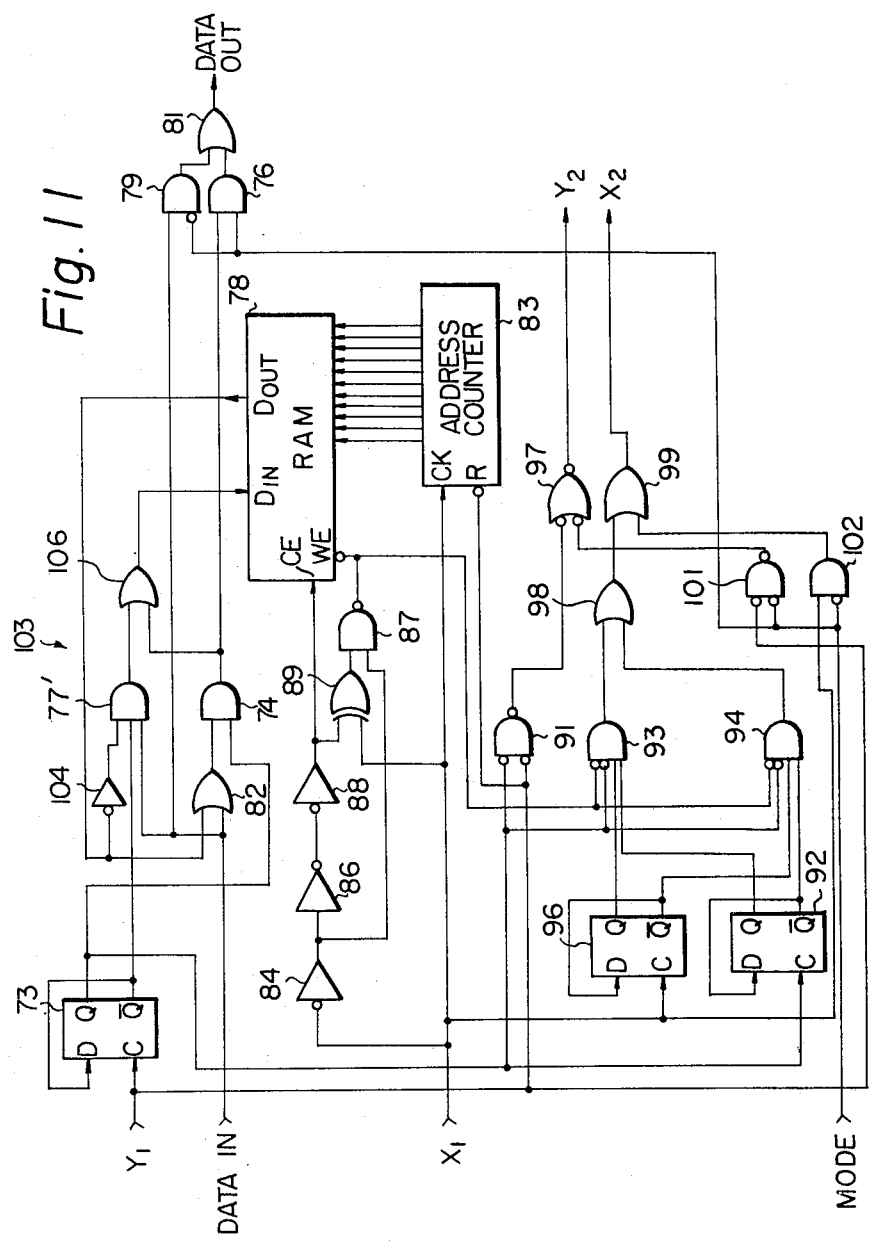
FIG. 11 is a diagram of a modified extractor adapted to produce good reproductions of original documents having thick lines.

FIG. 11 shows a modified apparatus of the present invention which is adapted to solve this problem and prevent merging of adjacent dark areas. The apparatus is designated as 103 and like elements are designated by the same reference numerals used in FIG. 7. The apparatus 103 comprises an inverter 104 having an input connected to the data output of the RAM 78 and an output connected to an input of an AND gate 77'. The AND gate 77' differs from the AND gate 77 only in that it comprises another input.

The output of the AND gate 77' is connected to an input of an OR gate 106, the output of which is connected to the data input of the RAM 78. The output of the AND gate 74 is connected to another input of the OR gate 106.

Figure 10D:
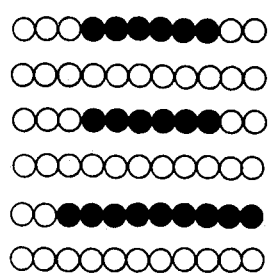
Figure 10C:
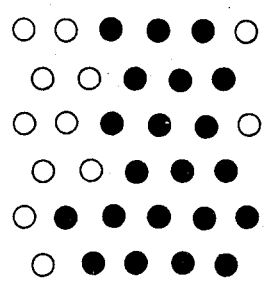
Figure 10E:
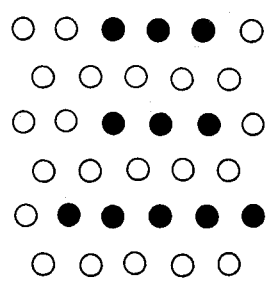

The data output of the RAM 78 is inverted by the inverter 104 and applied to the AND gate 77'. Where the data output of the RAM 78 is high, the AND gate 77' is inhibited and a logically low data signal is written into the RAM 78. In other words, if the data signal in the corresponding position in the preceding scan line is high, the data signal in the current scan line is made low. This positively prevents adjacent dark areas from merging together, as shown in FIGS. 10d and 10e, although thin lines are not lost.

Figure 12A:
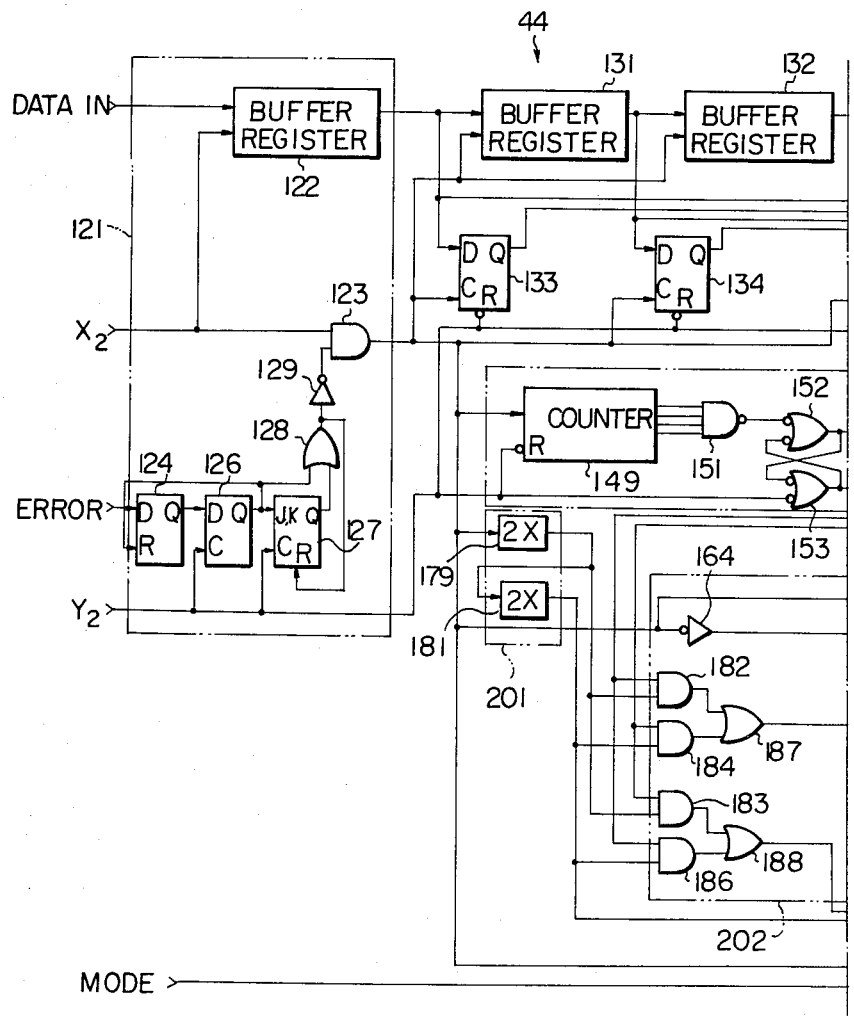
FIG. 12, including a and b, is a schematic diagram of an interpolator of the present apparatus.
Figure 12B:
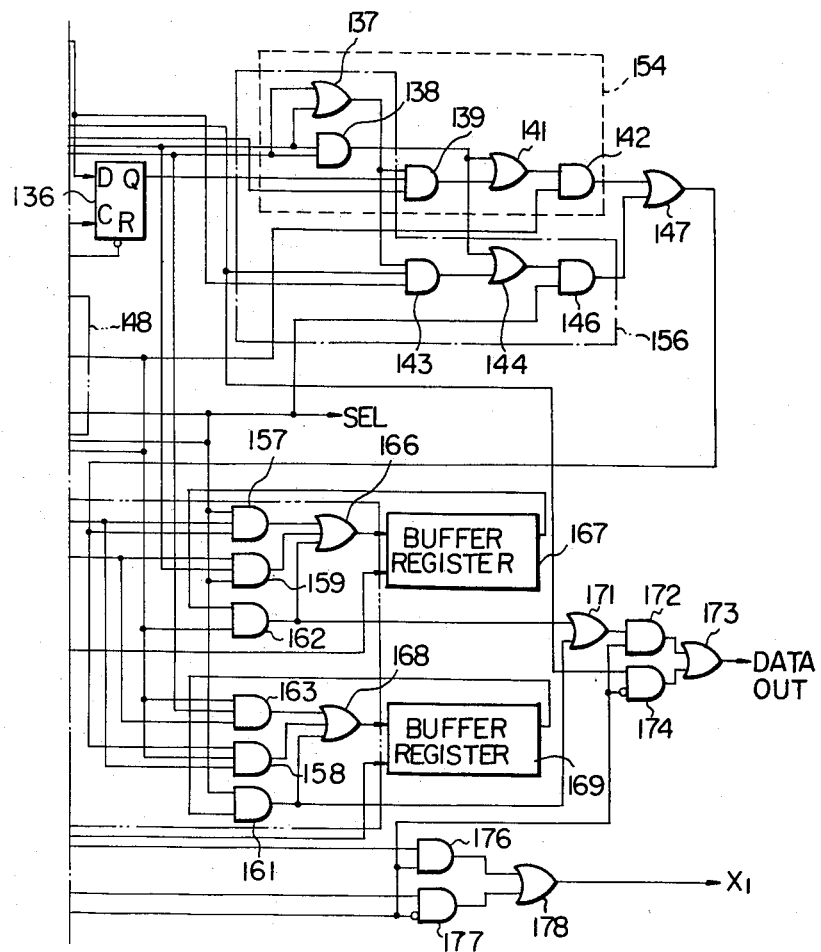

The interpolator 44 is shown in detail in FIG. 12 and comprises an error remover 121 which includes a buffer register 122. Where each original scan line comprises 1728 data signals, the buffer register 122 has a capacity of 864 bits. This is because every second data signal was removed in the extractor 36. The data signals are fed into the buffer register 122 from the expander 43. The pulses X2 are also fed into the buffer register 122 as clock pulses. The pulses X2 are further fed to an input of an AND gate 123.

The error remover 121 further comprises D type flip-flops 124 and 126 and a JK type flip-flop 127. An error signal ERROR is fed to the D input of the flip-flop 124. The Q output of the flip-flop 124 is connected to the D input of the flip-flop 126. The Q output of the flip-flop 126 is connected to the J and K inputs of the flip-flop 127 and also to the reset input of the flip-flop 124. The signal Y2 is applied to the clock inputs of the flip-flops 126 and 127. The Q outputs of the flip-flops 126 and 127 are connected to inputs of an OR gate 128, the output of which is connected to the reset input of the flip-flop 127. The output of the OR gate 128 is also connected through an inverter 129 to an input of the AND gate 123.

The output of the AND gate 123 is connected to clock inputs of buffer registers 131 and 132 which are identical to the buffer register 122. The output of the buffer register 122 is connected to the input of the buffer register 131. The output of the buffer register 131 is connected to the input of the buffer register 132. The outputs of the buffer register 122, 131 and 132 are connected to D inputs of D type flip-flops 133, 134 and 136 respectively. The output of the AND gate 123 is connected to clock inputs of the flip-flops 133, 134 and 136. The Y2 pulses are applied to inverting reset inputs of the flip-flops 133, 134 and 136.

Inputs of an OR gate 137 are connected to the output of the buffer register 131 and the Q output of the flip-flop 134 respectively. Inputs of an AND gate 138 are also connected to the output of the buffer register 131 and the Q output of the flip-flop 134 respectively. Inputs of an AND gate 139 are connected to the output of the OR gate 137 and the Q outputs of the flip-flops 133 and 136. Outputs of the AND gates 138 and 139 are connected to inputs of an OR gate 141, the output of which is connected to an input of an AND GATE 142.

Inputs of an AND gate 143 are connected to the output of the OR gate 137 and the buffer register 122 and 132. The outputs of the AND gates 138 and 143 are connected to inputs of an OR gate 144, the output of which is connected to an input of an AND gate 146. The outputs of the AND gates 142 and 146 are connected to inputs of an OR gate 147.

The output of the AND gate 123 is connected to the clock input of a counter 149 of a timing circuit 148. The Y2 pulses are applied to an inverting reset input of the counter 149. The parallel outputs of the counter 149 are connected to inputs of a NAND gate 151, the output of which is connected to an inverting input of an OR gate 152. The output of the OR gate 152 is connected to an inverting input of an OR gate 153. The output of the OR gate 153 is connected to an inverting input of the OR gate 152. The Y2 pulses are applied to an inverting input of the OR gate 153. The output of the OR gate 152 is connected to an input of the AND gate 142. The output of the OR gate 153 constitutes a signal SEL and is connected to an input of the AND gate 146. The gates 139, 141 and 142 constitute a first gate unit 154. The gates 143, 144 and 146 constitute a second gate unit 156. The gates 137 and 138 are common to the gate units 154 and 156.

The output of the OR gate 147 is connected to inputs of AND gates 157 and 158. The output of the AND gate 123 is connected to other inputs of the AND gates 157 and 158. The output of the OR gate 153 is connected to inputs of the AND gate 157 and also to inputs of AND gates 159 and 161. The output of the OR gate 152 is connected to an input of the AND gate 158 and also to inputs of AND gates 162 and 163. The output of the AND gate 123 is connected to inputs of the AND gates 159 and 163 through an inverter 164. The output of the buffer register 131 and the Q output of the flip-flop 134 are connected to inputs of the AND gates 159 and 163 respectively.

The outputs of the AND gates 157, 159 and 162 are connected to inputs of an OR gate 166, the output of which is connected to the data input of a buffer register 167. The output of the buffer register 167 is connected to an input of the AND gate 162. The outputs of the AND gates 158, 161 and 163 are connected to inputs of an OR gate 168, the output of which is connected to the data input of a buffer register 169. The output of the buffer register 169 is connected to an input of the AND gate 161. In the exemplary interpolator 44, the buffer registers 167 and 169 each have a capacity of 1728 bits.

The outputs of the AND gates 161 and 162 are connected to inputs of an OR gate 171, the output of which is connected to an input of an AND gate 172. The output of the AND gate 172 is connected to an input of an OR gate 173, the output of which is connected to the print logic unit 46. The output of the buffer register 122 is connected to an input of an AND gate 174, the output of which is connected to another input of the OR gate 173. The MODE signal is applied to an input of the AND gate 172 and an inverting input of the AND gate 174. The MODE signal is also applied to an input of an AND gate 176 and an inverting input of an AND gate 177, the outputs of which are connected to inputs of an OR gate 178. The horizontal synchronization pulses X1 appear at the output of the OR gate 178. The output of the AND gate 123 is connected to an input of the AND gate 177.

The output of the AND gate 123 is connected to an input of a frequency multiplier 179 which has a frequency multiplication ratio of two. The output of the frequency multiplier 179 is connected to the input of another frequency multiplier 181 which also has a frequency multiplication ratio of two. The output of the frequency multiplier 179 is connected to inputs of AND gates 182 and 183. The output of the frequency multiplier 181 is connected to inputs of AND gates 184 and 186 and also to an input of the AND gate 176. The outputs of the AND gates 182 and 184 are connected to inputs of an OR gate 187, the output of which is connected to the clock input of the buffer register 167. The outputs of the AND gates 183 and 186 are connected to inputs of an OR gate 188, the output of which is connected to the clock input of the buffer register 169.

The output of the OR gate 152 is connected to inputs of the AND gates 183 and 184. The output of the OR gate 153 is connected to inputs of the AND gates 182 and 186.

In operation, assuming that there is no erroneous or missing data, the AND gate 123 is enabled and the X2 pulses gated therethrough. The data from the expander 43 is fed into the buffer register 122 in synchronism with the X2 pulses. The data is fed from the buffer register 122 through the buffer registers 131 and 132. Thus, the buffer register 131 contains one line of data whereas the buffer registers 132 and 122 contain the lines immediately preceding and following said line respectively. The flip-flops 133, 134 and 136 contain the data signals immediately preceding the data signals which appear at the outputs of the buffer registers 122, 131 and 132 respectively.

The principle of the interpolator 44 is illustrated in FIGS. 13a and 13b and 14a to 14d. FIG. 13a illustrates the case of the normal mode and FIG. 13b illustrates the case of the dense mode respectively. X indicates a data signal which is to be inserted between data signals B and D which are to the left and right respectively of the data signal X in a particular scan line. A data signal was removed from the position of the data signal X in the extractor 36. W and Y indicate data signals in scan lines immediately above and below the signal X. The original data signals in the positions of the data signals W and Y were removed in the extractor 36 through combination of two scan lines into one scan line.

The interpolator 44 functions to insert the data signals X, W and Y into the stream of data signals in accordance with the following Boolean algebra logical relations:

$$W = A \quad (1)$$

$$X = B \cdot D + A \cdot C(B+D) \quad (2)$$

$$Y = X \quad (3)$$

The data signals W and Y are inserted merely by printing each scan line twice. The data signals X are inserted by sensing the data signals A, B, C and D and inserting a logically high data signal X between the data signals B and D when equation (2) is true and a logically low data signal X between the data signals B and D when equation (2) is false.

FIGS. 14a and 14b illustrate the case of a scan line containing the even numbered data signals. FIG. 14a shows the appearance of the data signals in relation to the original document, in which the current scan line is the middle scan line. However, the data signals are stored in the buffer registers 122, 131 and 132 as indicated in FIG. 14b. It will be seen that the data signals A and C are in the same column as the data signal D, rather than the data signal X. The case of a scan line containing the odd numbered data signals is shown in FIGS. 14c and 14d. It will be seen that due to the manner in which the data signals are stored in the buffer registers 122, 131 and 132 the data signals A and C are in the same column, or position, as the data signal B rather than the data signal X.

For the even scan lines (FIGS. 14a and 14b), the scan lines are reconstructed by alternatingly writing the data signals X and D into the buffer register 167 as the data signals are fed through the buffer registers 122, 131 and 132. The odd scan lines are reconstructed by alternatingly writing the data signals X and B into the buffer register 169. Each scan line in the buffer register 167 which contains 864 data signals D alternated with 864 inserted data signals X is circulated through the buffer register 167 twice and fed to the print logic unit 46 to be printed twice. The same is the case for the 864 data signals B alternated with the 864 inserted data signals X in the buffer register 169.

Each data signal is operated on in sequence as the data signals are fed through the buffer registers 122, 131 and 132. The data signal B appears at the output of the flip-flop 134 whereas the data signal D appears at the output of the buffer register 131. The OR gate 137 and AND gate 138 produce the logical sum and product respectively of the data signals B and D. In the case of odd scan lines, the data signals A and C appear at the outputs of the flip-flops 136 and 133 respectively. The AND gate 139 produces at its output, for odd lines, the partial solution of equation (2) constituted by A·C(B+D). The OR gate 141 produces the logical sum of this partial solution and the partial solution B·D from the AND gate 138 to provide a complete solution of equation (2). In a similar manner, for even scan lines, the data signals A and C appear at the outputs of the buffer registers 132 and 122 respectively. The AND gate 143 produces the partial solution A·C(B+D) which is logically summed with the partial solution B·D from the AND gate 138 by the OR gate 146 to provide a complete solution of equation (2).

The system timing is controlled by a frequency multiplier unit 201 comprising the frequency multipliers 179 and 181, a gate unit 202 comprising the gates enclosed in broken line and the timing circuit 148. The NAND gate 151 produces pulses HALF which are one-half the duration of the pulses Y2. The OR gates 152 and 153 function as a latch. In response to one pulse Y2 the output of the OR gate 152 goes high. In response to the next pulse Y2 the output of the OR gate 153 goes high, and so on. In other words, the outputs of the OR gates 152 and 153 go high in response to every second pulse Y2 in an alternating manner.

When the output of the OR gate 152 is high, it is time for writing an odd scan line into the buffer register 169 and printing an even scan line previously stored in the buffer register 167. The writing operation will be described first.

The high output of the OR gate 152 enables the AND gate 142 which gates the data signals X therethrough to the AND gate 158 via the OR gate 147. The high output of the OR gate 152 inhibits the AND gate 146. The high output of the OR gate 152 is also applied to the AND gate 163 which has an input connected to receive the signal B.

Since 1728 data signals must be written into the buffer register 169, the frequency of the clock pulses applied to the register 169 must be twice the frequency of the clock pulses X2 which are applied to the buffer registers 122, 131 and 132. The high output of the OR gate 152 enables the AND gate 183 which gates the output of the frequency multiplier 179 to the clock input of the buffer register 169.

Assuming that during the period of a pulse X2 the pulse is high for half the period and low for the other half of the period, the high portion of the pulse X2 enables the AND gate 158 which gates the data signal X therethrough into the buffer register 169 in synchronism with a pulse output of the frequency multiplier 179. During the low portion of the period of the pulse X2 the AND gate 158 is inhibited and the AND gate 163 is enabled through the action of the inverter 164. The signal B is gated through the AND gate 163 into the buffer register 169 in synchronism with the next pulse output of the frequency multiplier 179. Thus, during the first half of the pulse X2 a signal X is written into the register 169. During the second half of the pulse X2 a signal B is written into the register 169. This action is continued until 864 signals X alternated with 864 signals B are written into the register 169.

Simultaneously with this action the previous even scan line is being output twice from the buffer register 167 in order to print the line twice. In order to accomplish this, the frequency of the clock pulses applied to the register 167 must be four times the frequency of the pulses X2. The high output of the OR gate 152 enables the AND gate 184 which gates the output of the frequency multiplier 181 to the clock input of the register 167. Since the output of the frequency multiplier 179 is twice the frequency of the pulses X2, the output of the frequency multiplier 181 is four times the frequency of the pulses X2. The high output of the OR gate 152 enables the AND gate 162 which gates the output of the register 167 to the input thereof. Thus, the scan line in the register 167 is recirculated therethrough twice in response to 3456 clock pulses. The output of the register 167 is gated through the OR gate 171, AND gate 172 and OR gate 173 to the print logic unit 46.

In response to the next Y2 pulse the output of the OR gate 152 goes low and the output of the OR gate 153 goes high. This causes the odd scan line which was written into the buffer register 169 to be output and the next even scan line to be written into the buffer register 167. The high output of the OR gate 153 enables the AND gates 146 and 157 to gate the X signals to the register 167. The high output of the OR gate 153 enables the AND gate 159 to gate the D signals to the register 167. The AND gate 182 is enabled by the high output of the OR gate 153 to gate the output of the frequency multiplier 179 to the clock input of the buffer register.

The AND gate 161 is enabled by the high output of the OR gate 153 to gate the output of the buffer register 169 to the input thereof to recirculate the odd scan line through the register 169. The high output of the OR gate 153 enables the AND gate 186 which gates the output of the frequency multiplier 181 to the clock input of the register 169.

When the signal MODE is high for the extraction mode, the AND gates 172 and 176 are enabled to gate the data signals from the buffer registers 167 and 169 and the output of the frequency multiplier 181 therethrough respectively. When the signal MODE is low for the straight transmission mode, the AND gates 174 and 177 are enabled to gate the output of the buffer register 122 and the AND gate 123 therethrough respectively. It will be recalled that the output of the AND gate 123 is constituted by the pulses X2.

Where data is missing in a scan line due to a malfunction in transmission or the like, the operation of the interpolator 44 may become completely erroneous. As viewed in FIGS. 20a and 20b for the normal and dense scan modes respectively, the relationship between the signals A, B, C, D and X may become completely erroneous as illustrated by way of example. The error remover 121 is adapted to overcome this problem.

Figure 19A:
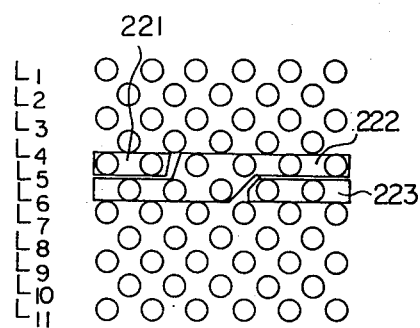
FIGS. 19a to 19d are diagrams illustrating a data error in the apparatus.
Figure 19C:
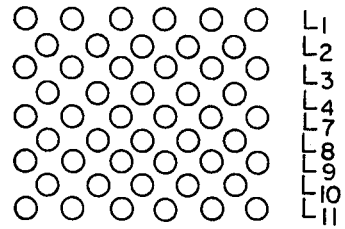

FIG. 19a shows a section of erroneous data 222 in scan lines L5 and L6 between two sections 221 and 223 of good data. The error remover 121 functions to remove both scan lines L5 and L6 so that the data appears as in FIG. 19c. Although the two removed lines L5 and L6 provide a slightly distorted reproduction, the regularity of the zig-zag pattern is not interrupted and the operation of the interpolator 44 is not made erroneous.

Figure 19B:
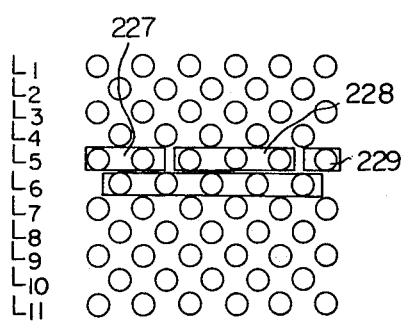
Figure 19D:
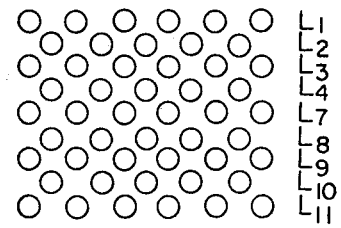

FIG. 19b shows an example of a section 228 of erroneous data in line L5 between good data 227 and 229 on line L5, the good data 229 continued on line L6. The error remover 121 functions in the same manner as above to remove not only the erroneous line L5 but also the following good line L6 to provide a regular zig-zag pattern as shown in FIG. 19d.

In operation, an ERROR signal is transmitted from the transmitting apparatus to the error remover 121 in response to sensed erroneous data in a scan line. The signal ERROR causes the flip-flop 124 to be set in response to the next signal Y2. FIG. 21 shows the operation of the error remover 121. The high Q output of the flip-flop 124 causes the flip-flop 126 to be set in response to the next Y2 pulse. The high Q output of the flip-flop 126 is inverted by the inverter 129 to inhibit the AND gate 123. This prevents the next scan line from being passed from the buffer register 122 into the buffer register 131 by preventing the pulses X2 from reaching the clock inputs of the buffer registers 131 and 132.

The high output of the flip-flop 126 causes the flip-flop 127 to be set by the next pulse Y2. The flip-flop 124 is reset when the output of the flip-flop 126 goes high. Thus, the low Q output of the flip-flop 124 causes the flip-flop 126 to be reset when the flip-flop 127 becomes set. The high output of the flip-flop 127 inhibits the pulses X2 for the next scan line. The next pulse Y2 resets the flip-flop 127, the output of which goes low to enable the AND gate 123. In this manner, the scan line containing the erroneous data and also the next scan line are removed.

Figure 17:
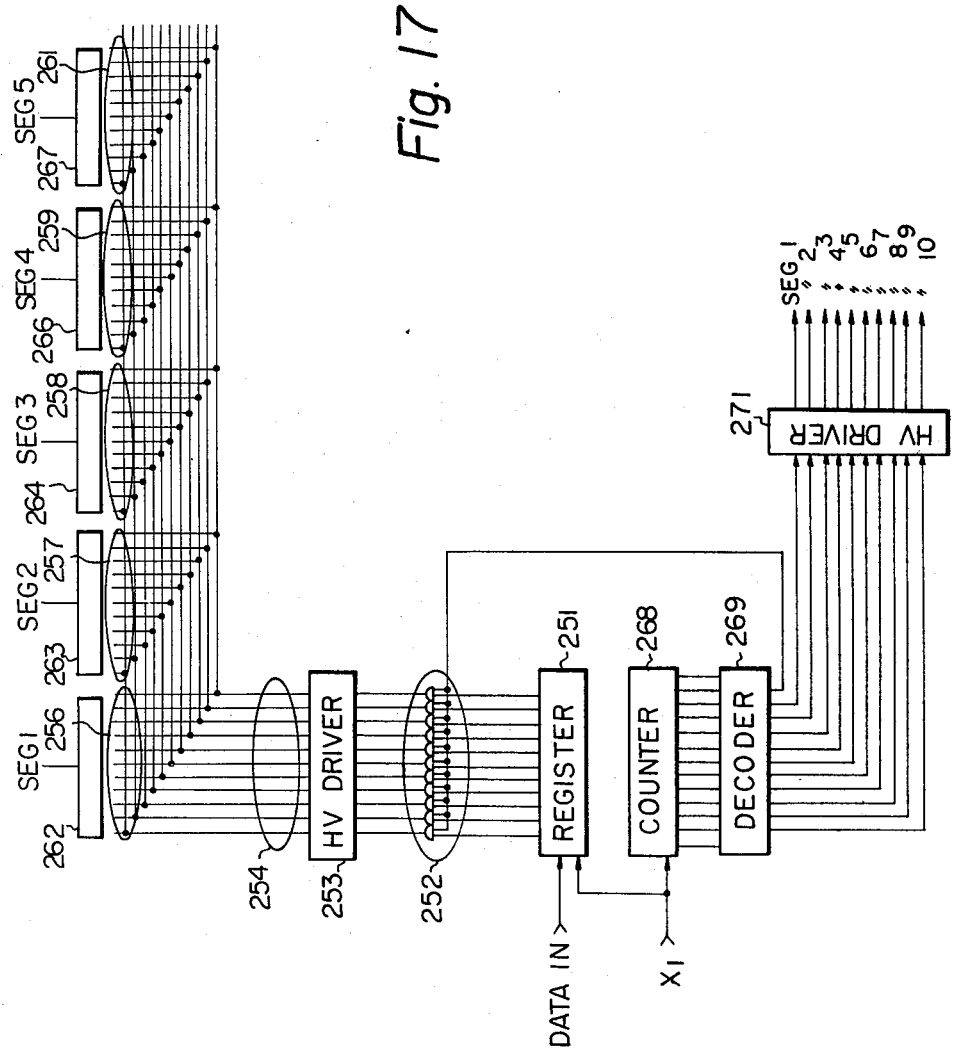
FIG. 17 is a schematic diagram of an electrostatic printer portion of the present apparatus.

Various sections of the print logic circuit 46 and print drive unit 53 are shown in FIG. 17. The data signals are fed into a shift register 251 in synchronism with the X1 pulses from the interpolator 44. The parallel outputs of the register 251 are connected through AND gates which are collectively designated as 252 to a high voltage driver 253. When a particular AND gate 252 produces a high output the driver 253 produces a high negative voltage on a respective bus line, the bus lines being collectively designated as 254. Recording needle groups 256, 257, 258, 259 and 261 are illustrated as comprising recording needles connected to the respective bus lines 254. All of the recording needles are arranged in a line. Back electrodes 262, 263, 264, 266 and 267 are provided in a line adjacent to the needle groups 256, 257, 258, 259 and 261 respectively. Copy paper (not shown) is moved between the recording needles and back electrodes perpendicular to the line of recording needles in an incremental manner.

The pulses X1 are counted by a counter 268. When the count in the counter 268 equals the number of bits in the register 251 a decoder 269 feeds a signal to a high voltage driver 271 which applies a high positive voltage SEG1 to the back electrode 262. The counter 268 also enables the AND gates 252. Where the data signal on a bus line 254 is high, an electrostatic charge is applied to the copy paper by the respective recording electrode 256. Where the data signal on a bus line 254 is low, no charge is applied to the copy paper.

Then, more data signals are fed into the register 251. When the contents of the register 251 are completely replaced by new data signals, the decoder 269 causes the driver 271 to apply a high positive voltage SEG2 to the next back electrode 263. The new set of data signals cause an electrostatic charge pattern to be formed on the paper adjacent to the back electrode 263. In other words, a charge pattern is only formed on the paper adjacent to the back electrode which is energized. All of the back electrodes are energized by the decoder 269 and driver 271 in a sequential manner to print an entire scan line of 1728 data points. After an entire scan line is operated on in this manner, the paper is moved by one increment to effect vertical scan. After an electrostatic charge pattern representing the original document is formed on the entire surface of the copy paper, a toner substance is applied to the copy paper to produce a visible toner image. The toner image is fixed to the copy paper to provide a permanent reproduction or facsimile of the original document.

Figure 18:
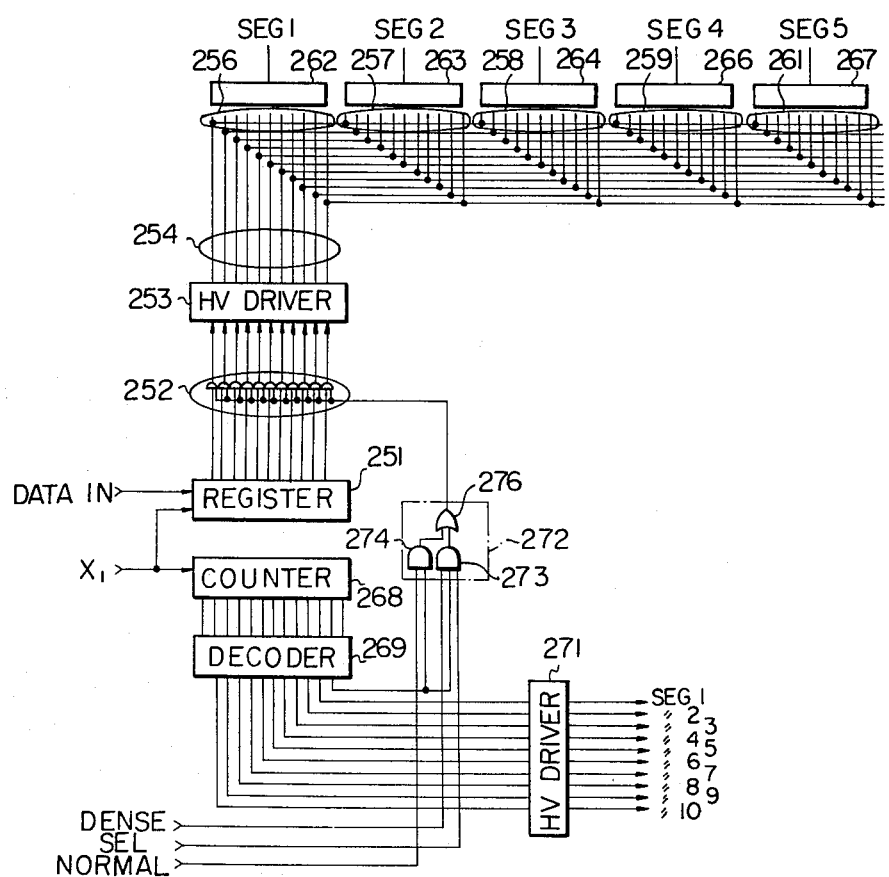
FIG. 18 is similar to FIG. 17 but shows a modified printer portion.

A modification of the circuit of FIG. 17 is shown in FIG. 18, in which like elements are designated by the same reference numerals. The embodiment of FIG. 18 comprises means for printing in a medium dense mode. A gate circuit 272 comprises AND gates 273 and 274 which have inputs connected to the output of the counter 269 leading to the AND gates 252. DENSE and NORMAL mode signals are applied to inputs of the AND gates 273 and 274 respectively. The signal SEL from the output of the OR gate 153 is applied to another input of the AND gate 273. The outputs of the AND gates 273 and 274 are connected to inputs of an OR gate 276, the output of which is connected to outputs of all of the AND gates 252.

In the normal scan mode, the AND gate 274 is enabled and the operation of the circuit is the same as described above. However, in the dense scan mode, if the signal DENSE is made high and the signal NORMAL is made low, the AND gate 273 is enabled but only while the signal SEL is high. This causes every second set of two identical scan lines to be omitted.

Figure 15:
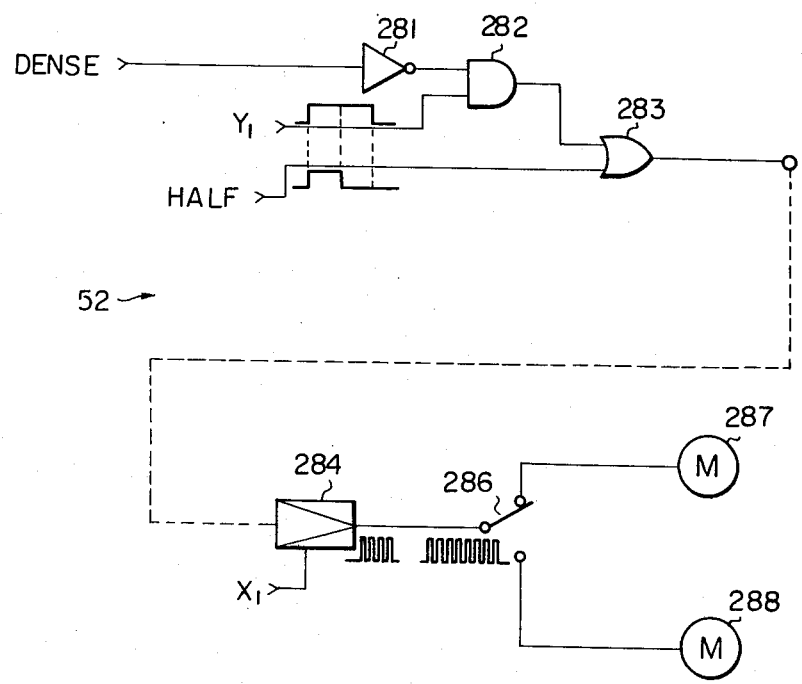
FIG. 15 is a schematic diagram of a printer control portion of the present apparatus.

FIG. 15 shows an important part of the power switch unit 52. The signal DENSE is applied to an input of an inverter 281, the output of which is applied to an input of an AND gate 282. The pulses Y1 are applied to another input of the AND gate 282. The output of the AND gate 282 is connected to an input of an OR gate 283, the output of which is connected to an input of a drive unit 284. The pulses X1 are applied to another input of the drive unit 284. The output of the drive unit 284 is connected through a switch 286 to either a scanner drive motor 287 or a printer drive motor 288, the motors being of the stepping type.

The signal HALF has half the duration of a pulse Y1, being equal to four pulses X1. A pulse Y1 is equal in duration to eight pulses X1. In the normal mode, the AND gate 282 is enabled by the low DENSE signal which is inverted by the inverter 281. Thus, the pulses Y1 are gated therethrough to the drive unit 284 which comprises a gate (not shown) controlled by the output of the OR gate 283. Pulses X1 are amplified and gated through the drive unit 284 as long as the output of the OR gate 283 is high. The pulses drive the motor 287 or the motor 288 depending on the position of the switch 286 (whether the apparatus is in the transmission or receiving mode).

One pulse causes the motor 287 or 288 to move the original document 33 or copy paper (not shown) by 1/32 mm. Thus, eight pulses cause the document or paper to move by ¼ mm, as illustrated in FIG. 4a for the normal mode.

Figure 16:
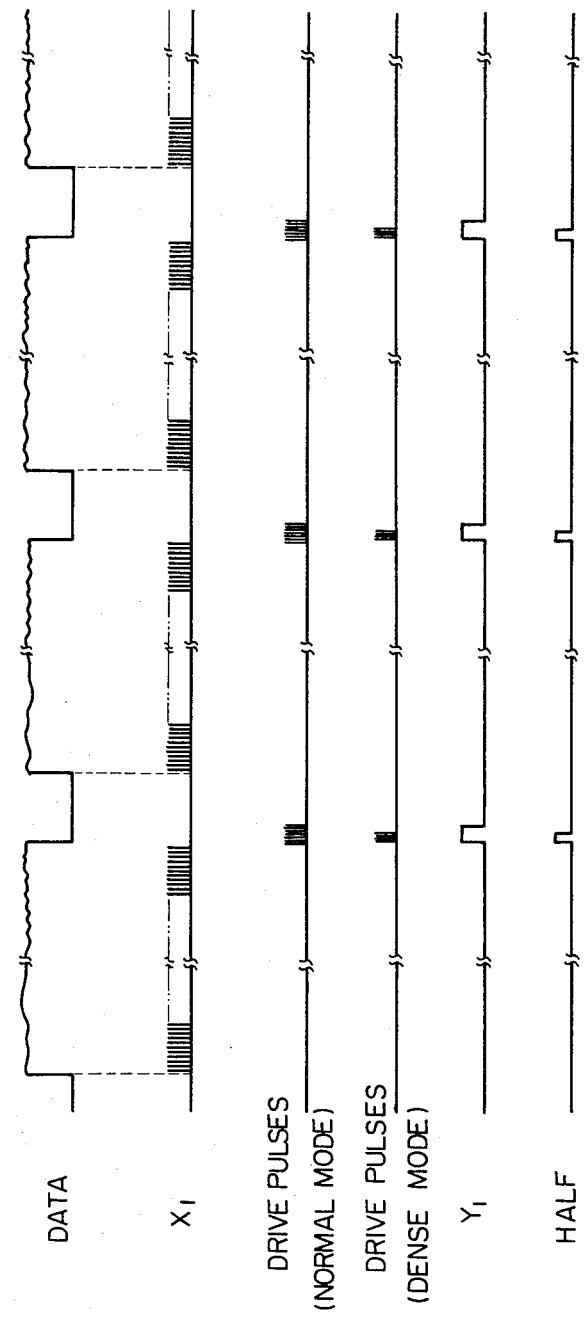
FIG. 16 is a timing diagram of the printer control portion.

In the dense mode, the AND gate 282 is inhibited and the signals HALF are applied to the drive unit 284. This allows only four pulses to be applied to the motor 287 or 288 and causes a vertical scan increment of ⅛ mm. FIG. 16 shows the relationship between the various signals.

In summary, it will be seen that the present invention provides, in addition to known run length encoding or the like, a compression method which results in an additional compression factor of four, since the data signals transmitted are only ¼ the number of the original data signals. Various modifications will become possible for those skilled in the art after receiving the teachings of the present disclosure without departing from the scope thereof. For example, rather than utilizing run-length encoding, a compression system such as disclosed in Japanese patent application No. 49-85913 may be substituted.

What is claimed is:

1. A facsimile apparatus having a transmitter and a receiver, the transmitter comprising:
   a scanner for scanning an original document in two orthogonal directions and producing first binary data signals representing the document; and
   an extractor for extracting relevant data from the first data signals and producing second data signals corresponding thereto in a number less than the first data signals; the receiver comprising;
   an interpolator for sensing the second data signals and inserting data signals thereinto which correspond to the sensed data signals in a predetermined manner; and
   a printer for reproducing the original document in response to the second data signals and inserted data signals;
   the second data signals corresponding to logical sums of first data signals in corresponding positions in two adjacent scan lines;
   the extractor being constructed to make a first data signal in a scan line logically low if a first data signal in a corresponding position in a preceding scan line which is adjacent to said scan line is logically high.

2. An apparatus as in claim 1, in which the transmitter and receiver comprise means for selectively inhibiting operation of the extractor and interpolator respectively so as to pass data signals therethrough without alteration.

3. An apparatus as in claim 1, in which the scanner and printer are constructed to operate in synchronism at a selected one of a plurality of speeds.

4. A facsimile apparatus having a transmitter and a receiver, the transmitter comprising:
   a scanner for scanning an original document in an orthogonal pattern of scan lines, each scan line having alternating even and odd data signal positions, and producing first binary signals representing the document; and
   an extractor for extracting relevant data from the first data signals and producing second data signals corresponding thereto in a number less than the first data signals; the receiver comprising:
   an interpolator for sensing the second data signals and inserting data signals thereinto which correspond to the sensed data signals in a predetermined manner; and
   a printer for reproducing the original document in response to the second data signals and inserted data signals;
   the extractor producing logical sum data signals which correspond to logical sums of first data signals in corresponding positions in two adjacent scan lines and alternatingly passing and removing the logical sum data signals to produce the second data signals in such a manner that logical sum data signals in even positions are removed in a scan line and logical sum data signals in odd positions are removed in scan lines adjacent to said scan line.

5. An apparatus as in claim 4, in which the interpolator is constructed to control the printer to print each scan line twice.

6. An apparatus as in claim 4, in which the interpolator is constructed to insert data signals into positions corresponding to the removed logical sum data signals.

7. An apparatus as in claim 6, in which the interpolator is constructed to insert the data signals in accordance with the following Boolean algebra equation:

$$X = B \cdot D + A \cdot C(B+D)$$

where X is an inserted data signal;

B and D are second data signals in a same scan line as the inserted data signal adjacent to the inserted data signal on opposite sides respectively thereof; and A and C are second data signals in positions corresponding to the inserted data signal in immediately preceding and succeeding scan lines respectively.

8. An apparatus as in claim 4, in which the extractor produces the second data signals in such a manner that the number thereof is an integral fraction of the first data signals.

9. A facsimile apparatus having a transmitter and a receiver, the transmitter comprising:

a scanner for scanning an original document in two orthogonal directions and producing first binary data signals representing the document; and an extractor for extracting relevant data from the first data signals and producing second data signals corresponding thereto in a number less than the first data signals; the receiver comprising;

an interpolator for sensing the second data signals and inserting data signals thereinto which correspond to the sensed data signals in a predetermined manner; and a printer for reproducing the original document in response to the second data signals and inserted data signals;

the transmitter comprising error sensing means for sensing erroneous data in a scan line and producing an error signal in response thereto, the receiver comprising error removing means for removing said scan line and also a succeeding scan line in response to the error signal.

* * * * *